United States Patent
Tricarico

(10) Patent No.: US 10,442,440 B2
(45) Date of Patent: Oct. 15, 2019

(54) SYSTEM AND METHOD FOR ESTIMATING CUTOFF DURATION OF A VEHICLE

(71) Applicant: GM GLOBAL TECHNOLOGY OPERATIONS LLC, Detroit, MI (US)

(72) Inventor: Davide Tricarico, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 15/611,245

(22) Filed: Jun. 1, 2017

(65) Prior Publication Data

US 2018/0345986 A1     Dec. 6, 2018

(51) Int. Cl.
    *B60W 40/12*     (2012.01)
    *G07C 5/08*     (2006.01)
    *G06N 20/00*     (2019.01)

(52) U.S. Cl.
CPC ........... *B60W 40/12* (2013.01); *G07C 5/0808* (2013.01); *B60W 2420/52* (2013.01); *B60W 2420/54* (2013.01); *B60W 2510/1005* (2013.01); *B60W 2510/182* (2013.01); *B60W 2550/14* (2013.01); *B60W 2550/308* (2013.01); *G06N 20/00* (2019.01)

(58) Field of Classification Search
CPC ............ B60W 40/12; B60W 2420/52; B60W 2420/54; B60W 2510/1005; B60W 2510/182; B60W 2550/14; B60W 2550/308; G06N 99/005; G07C 5/0808
USPC ......................................................... 701/99
See application file for complete search history.

(56) References Cited

U.S. PATENT DOCUMENTS

| | | | | |
|---|---|---|---|---|
| 2005/0125137 A1* | 6/2005 | Shiiba | ................ | B60K 31/0008 701/96 |
| 2007/0005202 A1* | 1/2007 | Breed | ............... | B60W 50/0205 701/29.1 |
| 2013/0080019 A1* | 3/2013 | Isaji | ...................... | B60W 30/16 701/96 |
| 2013/0211696 A1* | 8/2013 | Frey | ...................... | B60K 26/02 701/110 |
| 2014/0330466 A1* | 11/2014 | Bureau | .................... | B60K 6/48 701/22 |
| 2014/0371974 A1* | 12/2014 | Huelsebusch | .......... | G05D 13/00 701/23 |
| 2015/0217766 A1* | 8/2015 | Kelly | .................. | F16H 61/0213 701/94 |
| 2015/0224845 A1* | 8/2015 | Anderson | ............ | B60G 17/019 701/37 |
| 2015/0349917 A1* | 12/2015 | Skaaksrud | .......... | G06Q 10/0833 370/328 |

(Continued)

FOREIGN PATENT DOCUMENTS

GB        2518970 A   *   4/2015   ............... B60K 6/20

*Primary Examiner* — Atul Trivedi
(74) *Attorney, Agent, or Firm* — Cantor Colburn LLP

(57) ABSTRACT

In accordance with an exemplary embodiment, a cutoff duration estimation system for a vehicle includes a vehicle model module having a vehicle profile model of the vehicle, a front vehicle detection module having a front vehicle deceleration model operable to determine a rate of close between the vehicle and a front vehicle, and a cutoff duration estimation system operable to determine an amount of time an engine of the vehicle will be operating in an overrun condition based on the vehicle profile model and the front vehicle deceleration model.

14 Claims, 2 Drawing Sheets

(56) References Cited

U.S. PATENT DOCUMENTS

| | | | |
|---|---|---|---|
| 2016/0009335 A1* | 1/2016 | Biderman | B60L 15/20 |
| | | | 701/22 |
| 2016/0221575 A1* | 8/2016 | Posch | B60W 50/0098 |
| 2017/0057505 A1* | 3/2017 | Woodley | B60W 10/06 |
| 2017/0057512 A1* | 3/2017 | Woodley | B60W 10/06 |
| 2017/0066441 A1* | 3/2017 | Woodley | B60W 50/023 |
| 2017/0066442 A1* | 3/2017 | Woodley | B60T 17/221 |
| 2017/0072953 A1* | 3/2017 | Nemoto | B60W 30/16 |
| 2017/0190330 A1* | 7/2017 | Kelly | B60W 10/06 |
| 2018/0015926 A1* | 1/2018 | Cunningham | B60W 10/06 |
| 2018/0208176 A1* | 7/2018 | Kim | B60W 30/16 |
| 2019/0100204 A1* | 4/2019 | Plianos | B60W 30/188 |
| 2019/0100208 A1* | 4/2019 | Plianos | B60W 30/18072 |
| 2019/0100209 A1* | 4/2019 | Plianos | B60W 30/18072 |

\* cited by examiner

SYSTEM AND METHOD FOR ESTIMATING CUTOFF DURATION OF A VEHICLE

INTRODUCTION

The subject disclosure relates to the art of vehicles and, more particularly, to a system and method for estimating cutoff duration of a vehicle.

Modern vehicles perform various diagnostic and/or learning operations or tasks during various phases of operation. Diagnostic operations may occur during idle, travel, and/or cutoff phases of operation. For example, various emission related diagnostic operations and/or learning tasks may occur during cutoff. Cutoff, or engine overrun, is defined as a period of time during which an engine is in operation without the need for fuel-injection. For example, cutoff may occur when a vehicle is coasting towards a stop.

During cutoff there is an opportunity to perform diagnostic tests and/or learning operations. However, given that each cutoff period may vary and be of an unknown duration, a challenge exists in choosing which test and/or operation can be run. If the cutoff period ends before a test and/or operation is complete, information may not be properly gathered. Accordingly, it is desirable to provide a system that can determine a duration of operation in a cut-off mode.

SUMMARY

In accordance with an exemplary embodiment, a cutoff duration estimation system for a vehicle includes a vehicle model module having a vehicle profile model of the vehicle, a front vehicle detection module having a front vehicle deceleration model operable to determine a rate of close between the vehicle and a front vehicle, and a cutoff duration estimation system operable to determine an amount of time an engine of the vehicle will be operating in an overrun condition based on the vehicle profile model and the front vehicle deceleration model.

In addition to one or more of the features described above or below, or as an alternative, further embodiments could include an event selection and run module operable to select and run an event during the amount of time the engine of the vehicle is operating in the overrun condition.

In addition to one or more of the features described above or below, or as an alternative, further embodiments could include wherein the vehicle model module includes a brake pedal model module operable to determine an estimated deceleration of the vehicle based a braking requirement to bring the vehicle to a stop.

In addition to one or more of the features described above or below, or as an alternative, further embodiments could include wherein the vehicle model module includes a vehicle friction model module operable to estimate a rate of deceleration based on at least one of a road characteristic and an operating gear of the vehicle.

In addition to one or more of the features described above or below, or as an alternative, further embodiments could include wherein the vehicle model module includes a vehicle deceleration model module operable to determine a predicted rate of deceleration of the vehicle based on inputs from the brake pedal model module and the vehicle friction model module.

In addition to one or more of the features described above or below, or as an alternative, further embodiments could include a front vehicle sensing system operable to determine a distance between the vehicle and the front vehicle.

In addition to one or more of the features described above or below, or as an alternative, further embodiments could include wherein the front vehicle sensing system includes at least one of a sonar system and a light detection and ranging (LIDAR) sensor.

In addition to one or more of the features described above or below, or as an alternative, further embodiments could include a street model module for determining environmental conditions at the vehicle including at least one of a traffic condition, a position condition, a route condition, and a weather condition, a cutoff time estimation module operable to determine an amount of time an engine of the vehicle will be operating in an overrun condition based on the environmental condition.

In accordance with another aspect of an exemplary embodiment, a method of estimating a cutoff duration for a vehicle includes sensing an overrun condition, detecting a condition of the vehicle based on a vehicle profile model determined by a vehicle model module, determining a change in distance between the vehicle and a front vehicle, estimating a cutoff duration of the overrun condition based on the vehicle profile model and the change in distance between the vehicle and the front vehicle, and activating one of a diagnostic test and a learning operation for the cutoff duration.

In addition to one or more of the features described above or below, or as an alternative, further embodiments could include wherein detecting the condition of the vehicle includes detecting a friction condition including at least one of a vehicle gear and a road condition.

In addition to one or more of the features described above or below, or as an alternative, further embodiments could include determining a change in distance between the vehicle and the front vehicle.

In addition to one or more of the features described above or below, or as an alternative, further embodiments could include wherein detecting the change in distance between the vehicle and the front vehicle includes actively sensing the front vehicle with at least one of a sonar system and a light detection and ranging (LIDAR) system.

In addition to one or more of the features described above or below, or as an alternative, further embodiments could include wherein detecting the condition of the vehicle includes determining an estimated brake application pressure based on the change in distance between the vehicle and the front vehicle.

In addition to one or more of the features described above or below, or as an alternative, further embodiments could include determining an estimated rate of deceleration based on at least one of the estimated brake application pressure and the friction condition.

In addition to one or more of the features described above or below, or as an alternative, further embodiments could include wherein activating the one of a diagnostic test, and a learning operation includes selecting the one of the diagnostic test, and the learning operation that has a completion time less than the cutoff duration.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
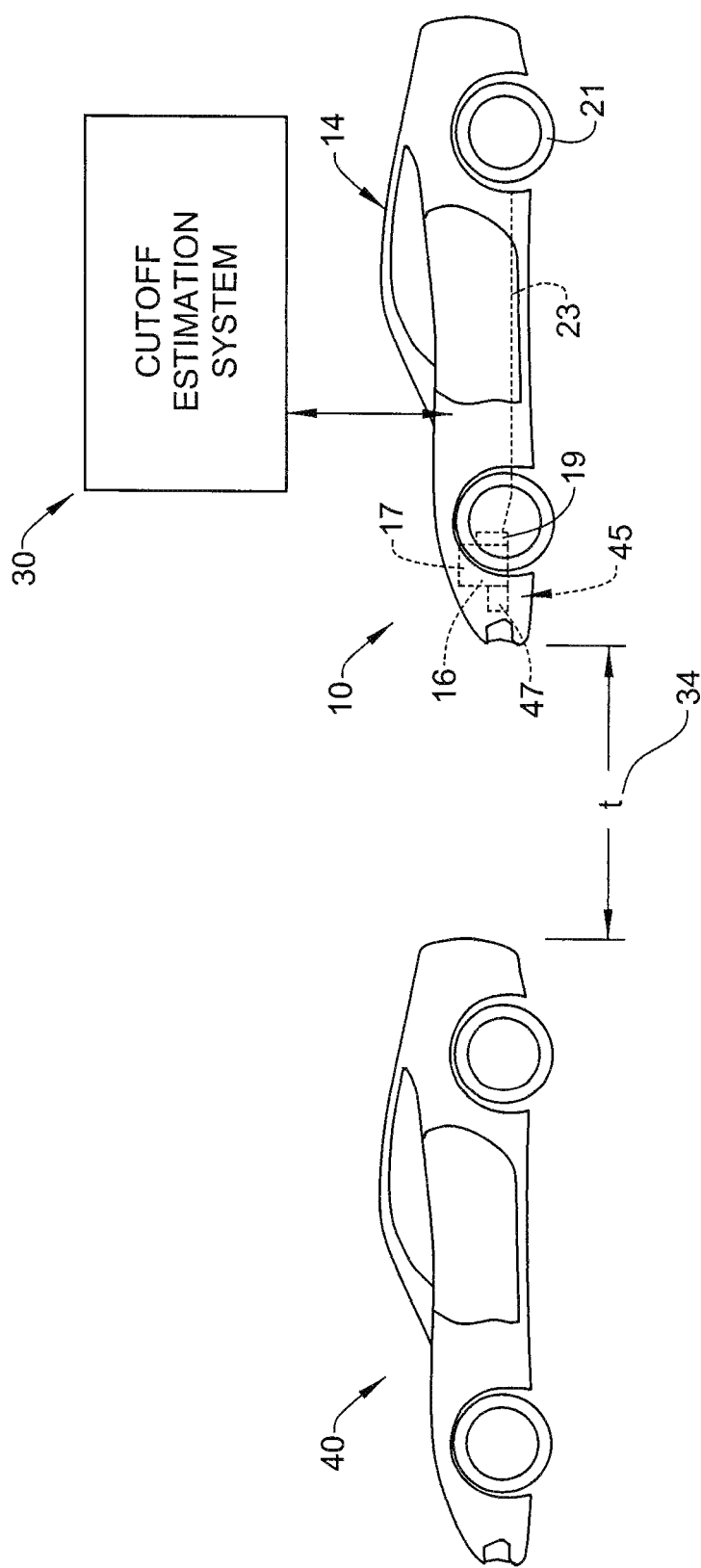
FIG. 1 depicts a vehicle including a cutoff duration estimation system, in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with an exemplary embodiment, is indicated generally at 10 in FIG. 1. Vehicle 10 includes a body 14 and a prime mover 16 that may take on the form of an internal combustion engine 17. It is to be understood that prime mover 16 may take on a variety of forms such as electric motors, hybrid electric systems and the like. Vehicle 10 also includes a transmission 19 operatively connected to prime mover 16 and to rear wheels, one of which is indicated at 21, through a drive shaft 23.

In accordance with an exemplary embodiment, vehicle 10 also includes a cutoff duration estimation system 30 that estimates a cutoff time duration period 34 based on a detection and position of a front vehicle 40. For example, vehicle 10 may include a sensor(s) 45 such as a light detection and ranging (LIDAR) sensor 47 that may detect front vehicle 40. Of course, it is to be understood that sensor(s) 45 may take on other forms, such as a sonar system. As will be detailed herein, cutoff time duration period 34 is estimated in order to determine which event(s) may be most efficacious to initiate. The term "cutoff" or "overrun" should be understood to describe a mode of operation in which prime mover 16 is not actively creating kinetic energy (for example, without torque forming fuel combustion, for internal combustion engines), but rather moves because of inertia. Cutoff can occur, for example, as vehicle 10 decelerates to a stop.

Figure 2:
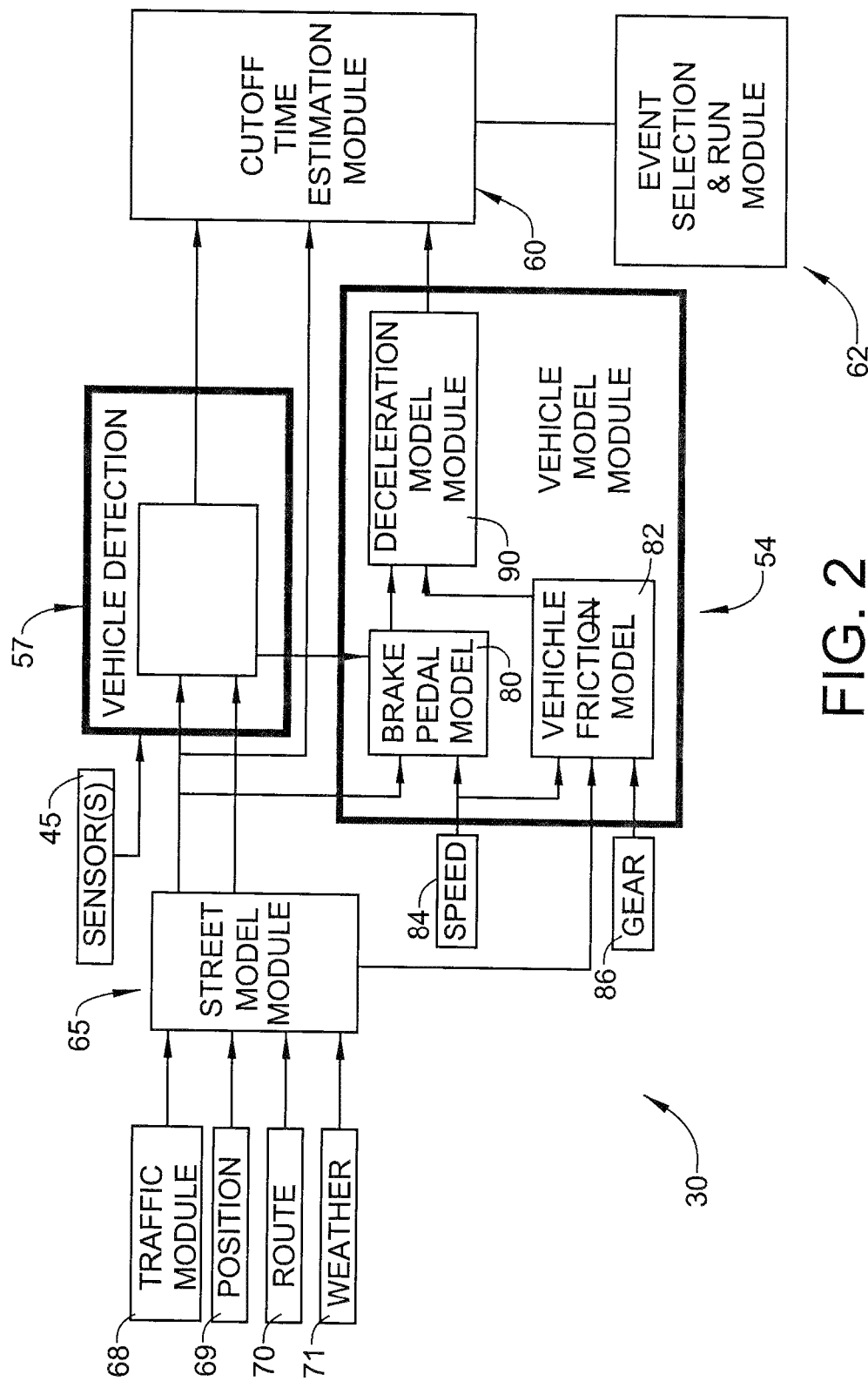
FIG. 2 depicts a block diagram illustrating the cutoff duration estimation system, in accordance with an exemplary embodiment.

In accordance with an exemplary aspect illustrated in FIG. 2, cutoff duration estimation system 30 may include a vehicle model module 54, operatively connected to a front vehicle detection module 57 and a cutoff time estimation module 60. Vehicle model module 54 may determine a vehicle profile model that may be employed to estimate cutoff duration as discussed herein.

Front vehicle detection module 57 determines a front vehicle deceleration model or predicted rate of deceleration of front vehicle 40 based on inputs and changes over time in distance sensed by sensor(s) 45. Cutoff time estimation module 60 provides input to an event selection and run module 62 that determines which event(s) includes a run time that can be completed within cutoff time duration period 34. Events may include diagnostic tests, learning events, and the like.

In further accordance with an exemplary aspect, cutoff duration estimation system 30 includes a street model module 65 that may receive environmental conditions such as traffic conditions from a traffic module 68, position conditions from a position module 69, route conditions from a route module 70, and/or weather conditions from a weather module 71 to provide inputs to vehicle model module 54. In this manner, vehicle model module 54 may, for example, estimate stopping distance based on road conditions. It is to be understood that while described as discrete modules, one or more of traffic module 68, position module 69, route module 70, and weather module 71 may be combined in a single system, such as a vehicle navigation system.

In still further accordance with an exemplary aspect, vehicle model module 54 may include a brake pedal model module 80 and a vehicle friction model module 82. Brake pedal model module 80 may receive inputs from a vehicle speed sensor 84, sensor(s) 45 via front vehicle detection module 57, and street model module 65 to determine an estimated braking profile or estimated brake application pressure necessary to decelerate vehicle 10 without impacting front vehicle 40. Vehicle friction model module 82 may determine friction conditions associated with vehicle 10. For example, vehicle friction model module 82 may receive road conditions data from street model module 65, operating gear information from a vehicle gear sensor 86 and vehicle speed information from vehicle speed sensor 84 to determine additional data pertaining to estimating a deceleration curve for vehicle 10 based on existing road and vehicle friction related conditions. The phrase "based on" should be understood to mean that the module relies on an input from sensors and/or other systems to formulate a mathematical model that may provide a final result or may provide data to another module for additional processing.

For example, after modeling a brake model based on vehicle speed, and front vehicle position, brake pedal model module 80 may output data to a vehicle deceleration model module 90. Similarly, vehicle friction model module 82 may output a friction model based on vehicle speed and road conditions to vehicle deceleration model module 90. At this point, vehicle deceleration model module 90 may calculate an estimated deceleration curve based on inputs from brake pedal model module 80 and vehicle friction model module 82.

In yet still further accordance with an exemplary embodiment, cutoff time estimation module 60 receives input from vehicle model module 54 and front vehicle detection module 57 and, based on those inputs, calculates an estimated rate of deceleration and cutoff time duration period 34, or an estimated time vehicle will be operating in a cutoff or overrun condition. At this point, event selection and run module 62 can determine which event would have a run time or completion time, and a need to run in a particular cutoff time duration period 34. In this manner, events may be chosen/prioritized based on need, avoidance of conflicts, and/or a likelihood of completion.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope of the application.

What is claimed is:

1. A cutoff duration estimation system for a vehicle comprising:
a vehicle model module including a vehicle profile model of the vehicle;
a front vehicle detection module including a front vehicle deceleration model operable to determine a rate of close between the vehicle and a front vehicle;
a cutoff duration estimation system operable to determine an amount of time an engine of the vehicle will be operating in an overrun condition based on the vehicle profile model and the front vehicle deceleration model; and
an event selection and run module operable to select and run one of a diagnostic event and a learning event during the amount of time the engine of the vehicle is operating in the overrun condition.

2. The cutoff duration estimation system according to claim 1, wherein the vehicle model module includes a brake pedal model module operable to determine an estimated deceleration of the vehicle based a braking requirement to bring the vehicle to a stop.

3. The cutoff duration estimation system according to claim 2, wherein the vehicle model module includes a vehicle friction model module operable to estimate a rate of deceleration based on at least one of a road characteristic and an operating gear of the vehicle.

4. The cutoff duration estimation system according to claim 3, wherein the vehicle model module includes a vehicle deceleration model module operable to determine a predicted rate of deceleration of the vehicle based on inputs from the brake pedal model module and the vehicle friction model module.

5. The cutoff duration estimation system according to claim 1, further comprising: a front vehicle sensing system operable to determine a distance between the vehicle and the front vehicle.

6. The cutoff duration estimation system according to claim 5, wherein the front vehicle sensing system includes at least one of a sonar system and a light detection and ranging (LIDAR) sensor.

7. The cutoff duration estimation system according to claim 1, further comprising: a street model module for determining environmental conditions at the vehicle including at least one of a traffic condition, a position condition, a route condition, and a weather condition, a cutoff time estimation module operable to determine an amount of time an engine of the vehicle will be operating in an overrun condition based on the environmental condition.

8. A method of estimating a cutoff duration for a vehicle comprising:
sensing an overrun condition;
detecting a condition of the vehicle based on a vehicle profile model determined by a vehicle model module;
determining a change in distance between the vehicle and a front vehicle;
estimating a cutoff duration of the overrun condition based on the vehicle profile model and the change in distance between the vehicle and the front vehicle; and
activating one of a diagnostic test and a learning operation for the cutoff duration.

9. The method of claim 8, wherein detecting the condition of the vehicle includes detecting a friction condition including at least one of a vehicle gear and a road condition.

10. The method of claim 9, further comprising: determining a change in distance between the vehicle and the front vehicle.

11. The method of claim 10, wherein detecting the change in distance between the vehicle and the front vehicle includes actively sensing the front vehicle with at least one of a sonar system and a light detection and ranging (LIDAR) system.

12. The method of claim 10, wherein detecting the condition of the vehicle includes determining an estimated brake application pressure based on the change in distance between the vehicle and the front vehicle.

13. The method of claim 12, further comprising: determining an estimated rate of deceleration based on at least one of the estimated brake application pressure and the friction condition.

14. The method of claim 8, wherein activating the one of a diagnostic test, and a learning operation includes selecting the one of the diagnostic test, and the learning operation that has a completion time less than the cutoff duration.

* * * * *